United States Patent [19]

Takeuchi

[11] 3,970,745

[45] July 20, 1976

[54] METHOD FOR PRODUCING HYDROGEN FROM WATER

[75] Inventor: Norio Takeuchi, Isehara, Japan

[73] Assignee: Director-General of the Agency of Industrial Science and Technology, Tokyo, Japan

[22] Filed: Mar. 24, 1975

[21] Appl. No.: 561,161

[30] Foreign Application Priority Data

May 9, 1974 Japan................................ 49-51538
May 17, 1974 Japan............................... 49-54504

[52] U.S. Cl.................................. 423/657; 423/93; 423/532; 423/539; 423/655; 423/592
[51] Int. Cl.² ...................... C01B 1/07; C01B 1/02; C01G 17/00
[58] Field of Search ............. 423/657, 539, 532, 93, 423/592

[56] References Cited
OTHER PUBLICATIONS

"Comp. Inorg. Chem.", by J. C. Bailar et al., 1973 Ed., p. 8, Pergamon Press, Elsmford, New York.
"Encyclopedia of Chem. Reactions", by C. A. Jacobson, vol. 3, 1949 Ed., p. 535, Reinhold Pub. Corp., New York.
P. Pascal's "Nouveau Traite' de Chimie Minerale", Tome 8, 1963, pp. 54, 55; Masson et Cie., Paris, France.
J. W. Mellor's "A Comp. Treatise on Inorg. and Theo. Chem.", vol. 7, Longmans, Green & Co., N. Y.

*Primary Examiner*—Edward Stern
*Attorney, Agent, or Firm*—William J. Daniel

[57] ABSTRACT

A method for producing hydrogen from water in which hydrogen is produced by reducing water using metallic germanium and the by-product, germanium monoxide, is reduced with a reducing agent to metallic germanium which is recycled and reused. In this case, it is necessary to regulate the oxidation of metallic germanium so as to stop at the germanium monoxide stage since the reduction of germanium dioxide to metallic germanium is difficult. Therefore, water vapor is advantageously reduced by using not less than 1 mole of metallic germanium to 1 mole of water vapor or it is indirectly reduced with an intermediate of carbon dioxide.

5 Claims, No Drawings

METHOD FOR PRODUCING HYDROGEN FROM WATER

BACKGROUND OF THE INVENTION

This invention relates to a method for producing hydrogen from water. More particularly, the invention relates to a method of a closed system for continuously producing hydrogen from water vapor, in which the latter is reduced to hydrogen in the presence of metallic germanium as a reducing agent and the germanium monoxide generated as a by-product is then reduced to metallic germanium to be recycled.

In recent years, a serious world-wide problem has arisen in that oil resources are running low and this problem has been taken up in order to alleviate same. As the material to take the place of the oil resources, several energy sources such as nuclear energy, solar energy, geothermal energy and hydrogen energy are now being eagerly investigated. Above all, hydrogen energy has an advantage in that it can be abundantly produced from infinitely existing water. In addition, it can be easily stored and transported since it is chemical energy. Further, this hydrogen energy can be employed for a variety of purposes such as cooking fuel and heating fuel as well as automobile fuel, aviation fuel, fuel cell material and so forth. Still further, being different from the known fossil fuels, it does not produce any poisonous or noxious gases such as carbon monoxide when it is burned.

As disclosed in the above, hydrogen energy is quite within the bounds of possibility as the substitute for oil resources. In order to realize the use of hydrogen energy, however, it is necessary to meet the demand to produce hydrogen at low cost and causing no environmental hazards such as pollution of air, etc.

BRIEF SUMMARY OF THE INVENTION

Accordingly, it is an object of the present invention to provide an improved method for producing hydrogen from water.

It is another object of the present invention to provide a closed reaction system for continuously producing hydrogen from water, in which water is reduced to hydrogen by using metallic germanium and germanium monoxide as a by-product is then reduced to metallic germanium so as to be recycled and reused.

It is a further object of the present invention to provide a method for producing hydrogen by indirectly reducing water with metallic germanium through the intermediate action of carbon monoxide, in which water is firstly reacted with carbon monoxide to produce water gas, and generated carbon dioxide in the water gas is then reduced to carbon monoxide by metallic germanium.

It is still a further object of the present invention to provide the selection of conditions of forming no germanium dioxide in order to effectively carry out the regeneration of the germanium monoxide to metallic germanium.

Other and further objects, features and advantages of the invention will appear more fully from the following description.

DETAILED DESCRIPTION OF THE INVENTION

In an embodiment of the method of the present invention, hydrogen is produced by causing 1 mole of water vapor to react thermally with 1 or more moles of metallic germanium.

In this case, it is necessary to use the metallic germanium as a reducing agent in order to carry out the thermal decomposition of water with mild but efficient conditions. When the metallic germanium is used, water can be thermally decomposed at a relatively lower temperature in the range of about 300 to 900°C. The reaction between water and metallic germanium according to the method of the present invention is represented by the following reaction equation:

$$Ge + H_2O \rightarrow GeO + H_2 \qquad (I)$$

In the practice of this reaction, the ratio of germanium to water must be set at a value not less than 1 in molar ratio, and preferably more than 2, so as to form easily reducible germanium monoxide. When this molar ratio is less than 1, a by-product of germanium dioxide ($GeO_2$) is formed and it is extremely difficult to reduce this germanium dioxide to metallic germanium, which prevents the process from becoming a completely closed system.

The metallic germanium is used in the form of powder and the larger the ratio to water is, the larger the yield of hydrogen becomes. The reaction between metallic germanium and water can be carried out either in a batch-wise process or in a continuous process. The separation of hydrogen from reaction products is considerably easy because the reaction is a solid-liquid system and solid-liquid separation means may be generally employed. Further in this reaction, some water vapor is contained in the produced hydrogen, but, however, the water vapor can be easily removed from hydrogen by cooling the reaction product.

According to the method of the present invention, the byproduct, germanium monoxide, is reduced to metallic germanium so as to be used for the above-mentioned reaction (I) by recycling. This reduction treatment can be carried out by various methods. However, in view of operation and economical efficiency of the reaction process, it has been found that sulfur dioxide and cobaltous oxide can be advantageously used for this purpose.

When sulfur dioxide is used as a reducing agent, the reaction is represented by the following equation:

$$GeO + SO_2 \rightarrow Ge + SO_3 \qquad (II)$$

This reaction is carried out at a temperature of 400° to 800°C. A higher pressure of sulfur dioxide is preferable and the reaction is advantageously proceeded at a pressure higher than 100 atm.

The sulfur trioxide produced through this reaction (II) can be used as it is for several other purposes in industrial production as a raw material. Meanwhile, in order to make the process a completely closed system, it may be reduced to sulfur dioxide and recycled as the raw material of the above-mentioned reaction (II). In this case, various reducing agents can be theoretically used. However, the selection of the reducing agents is important from an economical standpoint and closed system of the process. It has been found by the present inventors that the powders of lead oxide, cobaltous oxide and cuprous oxide are most suitable as such reducing agents. These oxides react easily with sulfur trioxide and in addition, the produced higher oxides decompose easily by heating and release oxygen gas.

When these metallic lower oxides are used as the reducing agents, the process can be made into a completely closed system as presented by the following equations:

$$SO_3 + (M)_nO \rightarrow SO_2 + (M)_nO_2 \qquad \text{(III)}$$

$$(M)_nO_2 \rightarrow (M)_nO + \tfrac{1}{2}O_2 \qquad \text{(IV)}$$

in which M is Pb, Co or Cu and $m$ and $n$ are integers determined by the valences of metals.

The reaction temperatures of reactions (III) and (IV) are different according to metal used, while they are always lower than 1000°C, so that the reactions may be industrially carried out without any particular difficulty. That is, when M is lead, the raction (III) is proceeded at a temperature of 100° to 300°C and $SO_3$ pressure of 50 atm or higher and the reaction (IV) is proceeded at a temperature of not lower than 300°C. Whem M is cobalt, the reaction (III) is proceeded at a temperature of 50° to 400°C and the reaction (IV) at a temperature not lower than 600°C. Further, when M is copper, the reaction (III) is proceeded at a temperature of 50° to 320°C and the reaction (IV) at a temperature not lower than 350°C. The rate of reaction (IV) can be increased when it is proceeded under reduced pressure.

The reduction of germanium monoxide using cobaltous oxide is represented by the following equation:

$$GeO + 3CoO \rightarrow Ge + Co_3O_4 \qquad \text{(V)}$$

This reaction can be carried out at a temperature not lower than 150°C. When cobaltous oxide is used as a reducing agent, the above-mentioned reactins (I), (V) and (IV) (i.e. $Co_3O_4 \rightarrow 3CoO + \tfrac{1}{2}O_2$) can be proceeded in the same reaction vessel, where only the reaction temperature in each step is to be regulated and the separation of the reaction product from reactants is not necessary. For example, a mixture of germanium powder and cobaltous oxide powder is fed into a reaction vessel and steam is supplied to the reaction vessel at 500°C to produce hydrogen. When the generation of hydrogen has ceased, the temperature is lowered to about 300°C, the pressure is then reduced and the temperature is again raised to 650°C to generate oxygen. After the generation of oxygen ceases, water vapor is again passed at a high temperature, producing hydrogen. By repeating the above operations, hydrogen and oxygen can be obtained alternately.

In the other embodiment of the method of the present invention, water vapor and carbon monoxide are firstly caused to react with each other to produce hydrogen and carbon dioxide. The carbon dioxide is then reduced to carbon monoxide by metallic germanium and the carbon monoxide is recycled and thus, hydrogen can be continuously produced from water.

In this case, the use of metallic germanium is necessary for the reduction of carbon dioxide and gives several advantages to the operation of the process. That is, the reducing activity of metallic germanium to carbon dioxide is very high and carbon dioxide can be reduced to carbon monoxide at a temperature of 450° to 900°C. In addition, it is advantageous that germanium monoxide generated in this reaction can easily be regenerated to metallic germanium. Therefore, by treating germanium monoxide with a proper reducing agent in the succeeding step and recycling the obtained metallic germanium, this process is also changed to a completely closed system. The above-mentioned reaction between metallic germanium and carbon dioxide is represented by the following equation:

$$Ge + CO_2 \rightarrow GeO + CO \qquad \text{(VI)}$$

When metallic germanium is reacted with carbon monoxide, the ratio of germanium to carbon dioxide ($Ge/CO_2$) is to be a value not less than 1 in molar ratio. If the above ratio is less than 1, germanium dioxide ($GeO_2$) is produced as a by-product. Being different from germanium monoxide, this germanium dioxide is reduced with difficulty so that the closed system of the process cannot be accomplished. The metallic germanium is used in the form of powder and the larger quantity of metallic germanium used in proportion to the quantity of carbon dioxide, the higher the yield of carbon monoxide. The reaction between germanium and carbon dioxide can be carried out in a batch-wise process and in a continuous process as well.

The carbon monoxide produced in accordance with the above-mentioned procedure is subjected to thermal reaction with water vapor and converted to water gas, which reaction is represented by the following equation:

$$CO + H_2O \rightleftarrows CO_2 + H_2 \qquad \text{(VII)}$$

This reaction is proceeded at about 400° to 600°C in the presence of a catalyst such as ferric oxide or chromic oxide. The reduction of germanium monoxide to metallic germanium may be carried out in a like manner as the foregoing.

According to the above-mentioned method of the present invention, hydrogen can be produced continuously from water through a process of a completely closed system. In addition, each reaction can be carried out with industrially advantageous conditions and therefore, the cost of producing hydrogen can be reduced to a great extent.

The method of the present invention will now be further explained by way of examples which are merely for illustration and should not be construed as limiting the scope of the present invention.

EXAMPLE 1

3 g of metallic germanium powder and 0.48 g of water were fed into an autoclave and were allowed to react at 810°C for about 30 minutes. After reaction, the gas in the autoclave was taken out by displacement with water and analyzed. The results of the analysis were 0.0518 g of hydrogen and 0.0003 g of water.

Then, 5.3 g of sulfur dioxide was added to the reaction vessel by dividing several parts and reacted at 690°C and 243 atm for about 1 hour for each added part of sulfur dioxide, respectively. The gas in the autoclave was then introduced into another autoclave which contained 6.2 g of lead oxide powder and further, it was reacted at 250°C and 171 atm for about 45 minutes. After reaction, the autoclave was cooled to room temperature and the gas within was completely discharged.

In the next step, this autoclave was heated to 350°C and maintained at this temperature for about 30 minutes. The temperature was then lowered to room temperature and the gas in the autoclave was taken out by displacement with water. The results of analysis of thus-obtained gas were 0.398 g of oxygen and 0.0007 g of water.

The yield (molar %) of hydrogen to water produced through the above series of reactions was 97.1% and the yield (molar %) of oxygen to water was 93.2%.

EXAMPLE 2

3 g of metallic germanium powder and 0.24 g of water were fed into an autoclave and reacted with stirring at 920°C for about 10 minutes. After reaction, the gas in the autoclave was taken out and analyzed obtaining the results of 0.0263 g of hydrogen and 0.0005 g of water.

In the next step, 3.5 g of sulfur dioxide was added to the same reaction vessel in several stages and was reacted in each stage at 650°C and 203 atm for about 20 minutes. After this addition of sulfur dioxide, the gas in the autoclave was introduced into another autoclave containing 5.0 g of lead oxide and then reacted together at 270°C and 190 atm for about 30 minutes. After reaction, the gas in the autoclave was completely discharged and the whole was collected and preserved.

The temperature of this autoclave was then raised and maintained at 510°C for about 10 minutes and the gas in the autoclave was analyzed obtaining the result of 0.196 g of oxygen and 0.0006 g of water. The yield of hydrogen through these reactions was 98.5% and that of oxygen 92.1%.

EXAMPLE 3

The germanium powder used in the foregoing Example 2 was recovered and weighed. The weight was 3.1 g. This germanium powder without any treatment was mixed with 0.24 g of water and they were reacted with stirring at 890°C for about 10 minutes. After this reaction, the gas in the reaction vessel was taken out and analyzed and the results of the analysis were 0.0261 g of hydrogen, 0.0004 g of water and a trace of other substances.

In the next procedure, the gas taken out and preserved in the foregoing Example 2 was introduced into the same reaction vessel in several stages and reacted in each stage at 705°C and 265 atm for about 30 minutes. After reaction, the gas portion was introduced into the autoclave containing lead oxide used in Example 2 and reaction was further proceeded at 250°C and 174 atm for about 45 minutes. After reaction, the gas in the autoclave was completely discharged and the contents were maintained at 430°C for about 30 minutes. Thus produced gas in the autoclave was taken out and analyzed, the results of which were 0.194 g of oxygen and 0.0004 g of water. Even though the metallic germanium, sulfur dioxide and lead oxide were recycled in this example, the yields were considerably high, that is, the yield of hydrogen was 98.0% and that of oxygen was 91.1%. Accordingly, it will be understood that the degredation of reactants is very small or negligible.

EXAMPLE 4

An autoclave was fed with 3 g of metallic germanium powder and 0.24 g of water and the contents were reacted with stirring at 920°C for about 15 minutes. After reaction, the gas in the autoclave was taken out by displacement with water and analyzed obtaining the result of 0.0261 g of hydrogen and 0.0005 g of water.

In the next step, 3.5 g of sulfur dioxide was fed into the same reaction vessel in several stages and the contents were reacted in each stage at 650°C and 203 atm for about 20 minutes. After this reaction, the gas in the reaction vessel was introduced into another autoclave containing 3.5 g of cobaltous oxide powder and reaction was carried out at 390°C and 270 atm for about 30 minutes.

Then, after completely discharging the gas from the autoclave, the temperature of the autoclave was raised and maintained at 910°C for about 20 minutes. When the gas produced during the reaction was analyzed, 0.209 g of oxygen was detected.

The yield of hydrogen to water through the series of these reactions was 97.7% and that of oxygen 98.0%.

EXAMPLE 5

In an autoclave, 3 g of metallic germanium powder and 0.37 g of water were reacted together at 700°C and the gas in the autoclave was taken out and analyzed. As a result, the gas contained 0.0389 g of hydrogen. In the next step, 7 g of sulfur dioxide was introduced into the same autoclave in several stages and the contents were reacted in each stage at 620°C and 200 atm for about 15 minutes. After this reaction, the gas in the autoclave was introduced into another autoclave containing 16 g of cuprous oxide powder and the contents were reacted at 80°C and 19 atm for about 35 minutes.

Then, after completely discharging the gas from the autoclave, the temperature of the autoclave was raised and maintained at 800°C for about 30 minutes. According to the analysis, the produced gas contained 0.301 g of oxygen.

The yield of hydrogen to water obtained through the series of reactions was 96.8% and that of oxygen was 91.5%.

EXAMPLE 6

An autoclave was fed with 3 g of metallic germanium powder, 3.1 g of cobaltous oxide and 0.37 g of water and the contents were reacted at 680°C for about 1 hour with stirring. After reaction, the gas in the reaction vessel was analyzed and it was understood that 0.049 g of hydrogen was contained therein.

In the next step, the slid contents of the autoclave were subjected to suction at 910°C and maintained at reduced pressure for about 30 minutes. The produced gas was collected and analyzed, in which 0.317 g of oxygen was contained.

The yield of hydrogen to water through the series of these reactions was 97.3% and that of oxygen was 96.4%.

EXAMPLE 7

A 200 ml autoclave was fed with 3 g of metallic germanium powder and carbon dioxide was then fed into the autoclave with pressure until the internal pressure became 2.5 atm (17°C). Thereafter, the contents were maintained at 800°C for about 30 minutes. Then, the gas in the reaction vessel was introduced into another autoclave containing 0.37 g of water and proper quantities as catalysts of ferric oxide, chromic oxide and alumina, and was maintained at 730°C for 45 minutes. Thereafter, the gas in the autoclave was taken out and analyzed. It was understood as a result, that the gas portion contained 0.256 g of carbon monoxide, 0.0211 g of hydrogen, 0.485 g of carbon dioxide and 0.163 g of water.

In the next step, sulfur dioxide was introduced into the above autoclave containing germanium monoxide after the reaction between carbon dioxide and metallic germanium and further, reaction was proceeded at 690°C for 30 minutes to reduce germanium monoxide to metallic germanium. After reaction, the entire gas in the autoclave was introduced into another autoclave containing 5 g of lead oxide and the contents were subjected to reaction at 240°C and 160 atm for 1 hour. After reaction, the gas was completely discharged from the autoclave and the contents were maintained at 350°C for 45 minutes. According to analysis, 0.322 g of oxygen was contained in the gas collected during that period.

The entire quantity of carbon dioxide was then separated from the above gas mixture of carbon monoxide, hydrogen, carbon dioxide and water and the separated carbon dioxide was introduced into the autoclave containing metallic germanium obtained by the above reaction of sulfur dioxide and germanium monoxide. The contents were then reacted again at 800°C for 30 minutes. After this reaction, the gas in the autoclave was further introduced into a similar autoclave containing 0.20 g of water and proper quantities of catalysts of ferric oxide, chromic oxide and alumina in like manner as the above-mentioned step and the contents were reacted at 730°C for 45 minutes. After reaction, the gas in the autoclave was taken out and analyzed and the results of the analysis showed that the gas contained 0.139 g of carbon monoxide, 0.0110 g of hydrogen, 0.257 g of carbon dioxide and 0.089 g of water.

Through the series of the above reactions, 71.8% of the initially added carbon dioxide was converted into carbon monoxide, and hydrogen 1.137 times as much as carbon monoxide in molar ratio was produced.

What I claim is:

1. A method for producing hydrogen from water, characterized in that water is reduced to hydrogen in an autoclave at a temperature within the range of about 300°–900°C by using powdered metallic germanium in a molar ratio of at least 1:1, and thereafter the by-product germanium monoxide is reduced in the autoclave with sulfur dioxide at a temperature of about 400°–800°C to metallic germanium which is recycled and reused.

2. The method of claim 1 wherein said reduction of germanium monoxide with sulfur dioxide is at a pressure higher than 100 atmospheres.

3. The method of claim 1 wherein the reduction of germanium monoxide with sulfur dioxide produces sulfur trioxide as a by-product and said sulfur trioxide is reduced with powdered lead, cobaltous or cuprous oxide to regenerate sulfur dioxide for recycling and reuse to reduce the germanium monoxide.

4. The method of claim 3 wherein said sulfur trioxide is reduced at a temperature within the range of about 100°–300°C when the reducing agent is lead oxide, within the range of about 50°–400°C when the reducing agent is cobalt oxide and within the range of about 50°–320°C when the reducing agent is copper oxide.

5. The method of claim 3 wherein said metallic oxide is oxidized in reducing said sulfur trioxide to sulfur dioxide and the resultant higher metallic oxide is regenerated by heating to a temperature sufficient to produce the original oxide.

* * * * *